United States Patent [19]

Soper et al.

[11] 4,045,653
[45] Aug. 30, 1977

[54] ELECTRIC COOKER WITH PRESS-STAKED HEATING ELEMENT AND METHOD OF MAKING THE SAME

[75] Inventors: LaVern G. Soper, Eau Claire; Brent W. Dressel, Elk Mound, both of Wis.

[73] Assignee: National Presto Industries, Inc., Eau Claire, Wis.

[21] Appl. No.: 700,110

[22] Filed: June 28, 1976

[51] Int. Cl.² .................................... F27D 11/00
[52] U.S. Cl. ..................... 219/438; 29/509; 29/611; 219/439; 219/462
[58] Field of Search ............... 29/509, 611; 219/430, 219/438, 439, 441, 442, 530, 540, 436, 463, 462

[56] References Cited

U.S. PATENT DOCUMENTS

| | | | |
|---|---|---|---|
| 2,662,158 | 12/1953 | Vallorani et al. | 219/463 X |
| 2,875,312 | 2/1959 | Norton | 29/611 X |
| 2,987,300 | 6/1961 | Greene | 29/522 X |
| 3,110,796 | 11/1963 | Bremer | 29/509 X |
| 3,221,396 | 12/1965 | Bremer et al. | 29/611 |
| 3,758,750 | 9/1973 | Van Toorn | 219/530 X |
| 3,885,128 | 5/1975 | Dills | 219/462 |

FOREIGN PATENT DOCUMENTS 153,279  1/1956  Sweden .................. 29/611

Primary Examiner—Victor A. DiPalma
Attorney, Agent, or Firm—Johnson, Dienner, Emrich & Wagner

[57] ABSTRACT

A sheathed electric heater element is fixed to the wall of a cooker by displacing metal from one side of the cooker wall to form an irregular channel having projecting ribs along its two sides, then placing the sheathed heater element between the two ribs and compressing the portions of the sheathed heater element between the channel base and the inner surfaces of the two ribs as the ribs are folded inwardly thereagainst.

9 Claims, 7 Drawing Figures

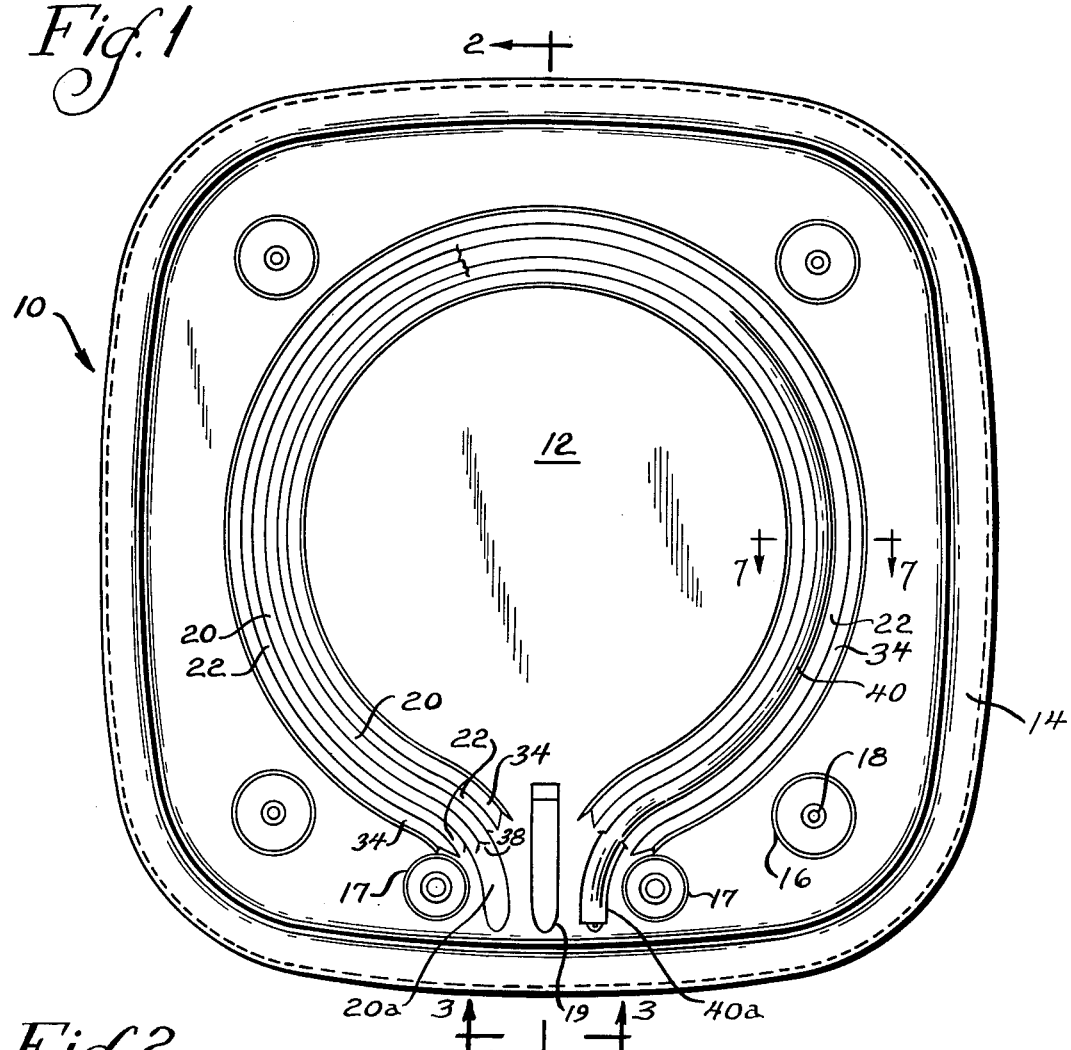
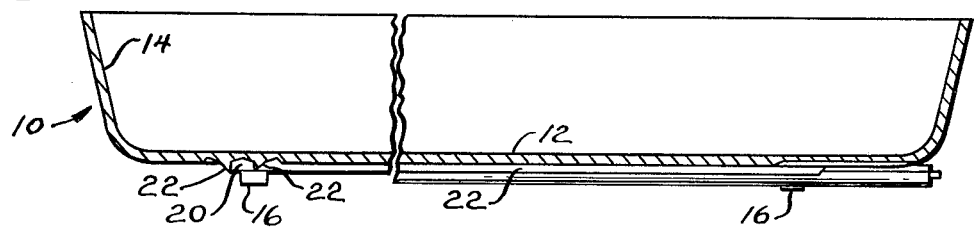
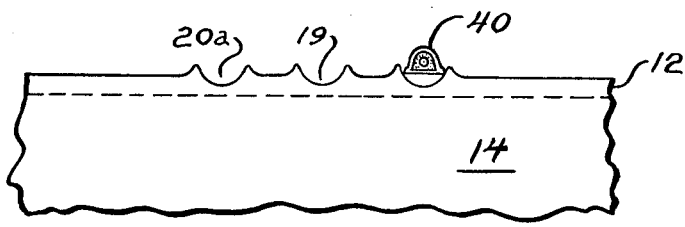

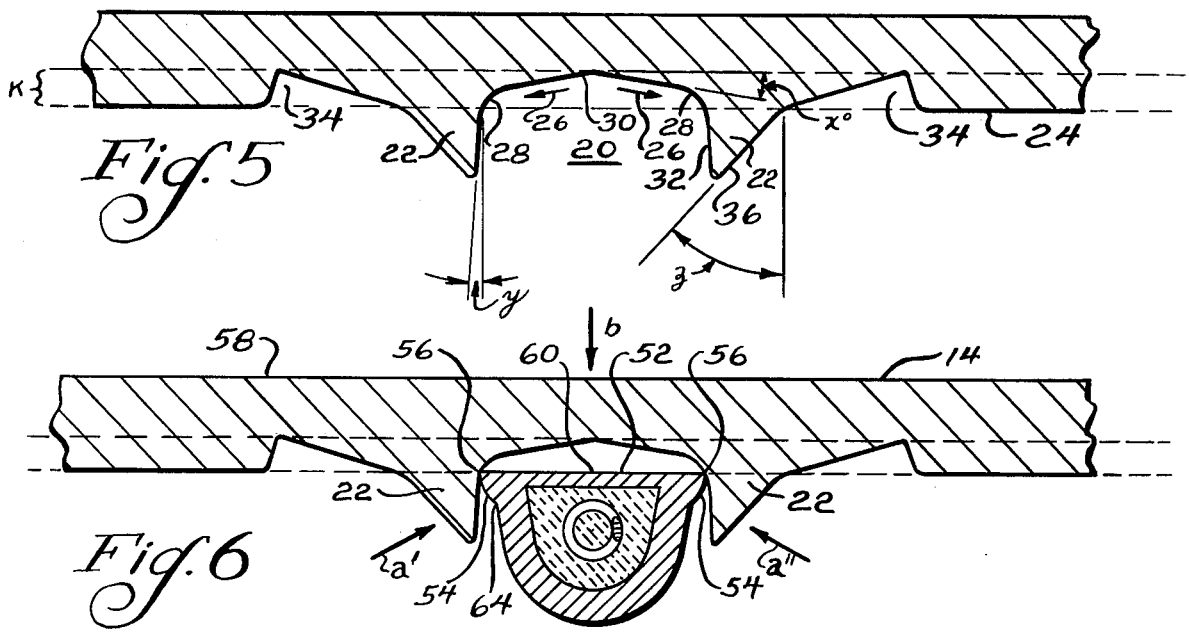

ELECTRIC COOKER WITH PRESS-STAKED HEATING ELEMENT AND METHOD OF MAKING THE SAME

This invention relates to electric cookers or the like of the usual household or kitchen variety and more particularly relates to a novel manner or method of fixing a sheathed electric heater element within the surface of the cooker wall. In its broader aspects, the invention has application generally to press-staking such heating elements to wrought metal structures.

Prior to the present invention, manufacturers of such cookers or appliances commonly secured a sheathed heating element to the underside of the cooker bottom wall, metallurgically, as by brazing, welding or soldering the element either to the surface of the cooker wall or within a channel formed in said surface. In Bremer, U.S. Pat. No. 3,110,796, a circular heating plate is cast of malleable iron with a meandering protuberance on one side thereof. Within the protuberance is a channel having a rounded bottom which complements the circular cross-section of a sheathed heater element to be assembled therein. The assembly is completed by simultaneously flattening the exposed side of the element and the end portions of the protuberance on either side of the channel into a coplanar relationship.

In accordance with the present invention, a channel is created in one side of the cooker wall either during the initial forging or pressing of the cooker from sheet stock, or in a subsequent step, by displacing metal out of one side of the cooker wall to form outstanding parallel spaced ribs having inner facing divergent surfaces which merge on arcs of short radii with the channel bottom forming below the cooker wall surface. The bottom of the channel is not flat but has a shallow vee-shaped in transverse section. Its width is slightly less than the widest transverse dimension of the sheathed electric heater element whereas the outer mouth of the channel is slightly larger.

In its presently preferred form, the sheathed heater element has a generally semicircular cross-section with a flat base and rounded protuberances along its two sides at said base such that the widest transverse dimension of the element is its flat base. The sheathed heater element is assembled by locating it between the two ribs with its flat base facing toward the channel bottom and lowering it into the channel until it comes to rest a small distance from the channel bottom and usually immediately adjacent the surface level of the cooker wall. The ribs have a height such that the protuberances along the sides of the element lie entirely below the outer edge of the ribs. The sheathed heating element is secured with the channel by folding the two ribs inwardly as counter pressure is applied to the opposite side of the cooker wall, sufficient pressure being applied that the base of the sheathed heater element and the rounded protuberances along either edge thereof are conformed to the engaging inner surfaces of the ribs and channel bottom.

Thus a feature of the invention is that the rounded surface of the staked heating element which remains exposed is substantially undisturbed. However, because the channel-confined portions of the sheathed heating element conform to the engaging sides and bottom of the confining channel and have wide area contact therewith, the element is both securely fixed to the cooker wall and also is in good heat conductive relation with the metal of the cooker wall.

The mechanical operations by which this is achieved work harden the cooker wall in the channel area wherefore a stronger construction is achievable in comparison to those areas which are annealed in the prior practiced brazing or welding operations.

A further feature of the invention is that the problems of current leakage are reduced as compared to brazed or welded units which must be passed through several washing operations to remove flux, et cetera.

Still another feature of the invention is that the steps of the staking process comprising the present invention are simple and practical as well as economical to perform so that manufacturing costs can be kept low while still obtaining an effective fixing of the heater element to the cooker wall.

Many other objects, advantages and features of the invention will be at once or will become apparant upon consideration of the description of a preferred embodiment of the invention which now will be described in connection with the accompanying drawing.

Referring first to the drawings wherein like parts are identified by like reference numerals, FIG. 1 is a bottom plan view of a cooker having an irregular channel formed in the underside of said bottom wall and a sheathed heating element fixed therein in accordance with the invention;

FIG. 2 is a sectional view taken on lines 2—2 of FIG. 1, looking in the direction indicated by the arrows;

FIG. 3 is a fragmented end view of the cooker as viewed from the situs indicated by line 3—3 in FIG. 1;

FIG. 4 illustrates on an enlarged scale a section taken through the sheathed heater element to be staked in the channel;

FIG. 5 is an enlarged sectional view taken through the bottom wall of the cooker to illustrate details of the channel and its formation;

FIG. 6 illustrates the heating element assembled in the receiving channel prior to staking; and FIG. 7 is a view generally similar to FIG. 6 and shows the staked assembly.

Referring now more specifically to the individual views and first to FIGS. 1–3, there is illustrated at 10 an exemplary electric cooker such as a fry pan or casserole having a sheathed electric heater element 40 fixed within a provided irregular channel 20 on its underside in accordance with the invention as hereinafter described. The illustrated cooker 10 has a flat bottom wall 12 which contains said channel 20 and a surrounding upturned continuous sidewall 14. The bottom wall of the cooker is of generally square shape with rounded corners and it has integrally formed cylinder portions 16 adjacent each of its four corners providing means to which legs (not shown) may be fixed as by screws which thredly connect into internally threaded openings 18. It also has a groove 19 for the probe of the conventional thermostatically controlled connector plug which detachably connects to terminal pins provided the ends of the heating element 40 as is well known. At 17 are internally threaded bosses to which a conventional plug guard may be threadedly connected. The cooker is formed from wrought metal such as aluminum sheet stock which is pressed to the described shape as by forging or stamping.

In accordance with the invention its channel 20 may be formed simultaneously with the forging of the cooker from sheet metal such as aluminum. It also may be formed in a subsequently conducted separate operation after the cooker has been given its required shape.

Now considering also FIG. 5 with FIGS. 1 and 2, channel 20 is defined by a pair of generally parallel-spaced outstanding ribs 22 which project from one side of the cooker wall. In the illustrated example, channel 20 is formed in the underside 24 of the bottom wall 12.

In accordance with the invention, as illustrated in FIG. 5, channel 20 is formed by displacing metal outwardly of side 24 along slight angles (usually about 5°) to the plane of the cooker wall 12 and to the opposed sides of the channel as indicated by arrows 26. The displaced metal is then forced outwardly along short arcs 28 of short radii at the sides of the forming channel bottom 30 to produce ribs 22. The formed channel bottom 30 thus lies entirely below surface 24 and has the indicated shallow vee-shape in transverse section and merges at its opposed sides along curved surfaces 28 embodying the aforementioned short arcs into the nearly vertical facing surfaces 32 of the two ribs which bound channel 20. Preferably, the inner surface 32 of the ribs are not truly vertical but are in divergent relation, possibly 3° off vertical as indicated at $y$ and are spaced apart a distance only slightly greater than the widest lateral dimension of the sheathed electric heater element 40 which is to be located therein as afterwards described. The width of the channel bottom 30 on the other hand is only slightly less than said widest lateral dimension of the heater element 40.

In order to effectively increase the height of said ribs 22 and also to effectively thicken the cross section thereof, further metal is displaced from areas 34 along the outside of the channel. Such metal when combined with the metal displaced from the channel bottom 30 is caused to impart a vee or pyramid shape to the ribs 22 in transverse section as illustrated by FIG. 5. Preferably the metal displaced from areas 34 is to about the same level as channel bottom 30 and is along long but shallow arcs such that at the level of surface 24 the ribs have a substantial thickness and so that their outer surface 36 is inclined at an angle $z$ of approximately 45° to the vertical.

As illustrated in FIG. 1, preferably channel 20 is arranged in the shape of nearly a full circle, the two ends 20a of the channel 20, however, being turned outwardly and disposed in apropriately spaced approximate parallel relation to opposed sides of and generally parallel with groove 19. Channel ends 20a serve primarily to locate the termini of the sheathed electric heater element 40 which is fixed in the channel. Therefore the rib formations 22 on either side of the channel may be discontinued at 38 where said channel ends 20a turn outwardly from the circularly-arranged main body of the heating element. Channel ends 20a may be separately formed and simultaneously with groove 19; and its bottom wall may be rounded as illustrated in FIG. 3. It may also have a shallow vee-shape similar to that of the channel 20 proper.

Referring now to FIG. 4, electric heater element 40 includes a resistance coil 42 enclosed within surrounding tubular sheath 44 packed with a dielectric material 46 as is conventional. Sheath 44 is of pliant ductile metal such as aluminum. In accordance with the present invention, sheathed heater element 40 is non-circular is cross section and in its presently preferred form includes a semicircular outer portion 48 with outwardly diverging sides 50 and a flat base 52. Its sheath 44 is of non-uniform thickness, being thickest through its diverging sides 50 and semicircular outer portion 48. Its flat base wall 52 is purposely much thinner. Immediately adjacent its base 52, sides 50 are thickened in cross section into sharply projecting rounded protuberances 54 which extend along the length thereof. The underside of these protuberances are coplanar with and comprise extensions of said flat base 52. In the presently preferred embodiment of the invention, the height or vertical dimension of said protuberances 54 approximates, or is only slightly less than $k$ representing the depth at which channel bottom 30 lies below surface 24 of wall 12.

Referring next to FIGS. 6 and 7, heating element 40 is first shaped to the irregular configuration of channel 20 and then located therein with its two ends 40a aligned in channel end portions 20a where they are conveniently accessible from one side of the cooker 10. Thereafter said ends 40a will be provided with terminal pins (not shown) by means of which the resistance coil 42 of the heater element 40 is connectable to an electrical power source utilizing a conventional cord set. The treatment of said heater element ends 40a is conventional and since it plays no part of the present invention, it is therefore neither illustrated nor will it be further described.

In accordance with the invention, heater element 40 when located between ribs 22 with its flat base 52 facing channel bottom 30 is positioned as deep into the channel as it will go. As previously indicated, its width is slightly less than the open mouth of the channel between ribs 22 but more than the width of the channel at bottom 30. As illustrated in FIG. 6, its side edges 56 come to rest approximately at the level of surface 24 or slightly therebelow with side edges 56 abutting arcuate surfaces 28. Base 52 is still a substantial distance from the underlying channel wall 30. Ribs 22 are also of sufficient height that the protuberances 54 lie a substantial distance inwardly of the channel mouth.

Assembly of the heater element 40 within channel 20 is completed by applying folding pressure to both ribs 22 from exteriorly thereof as indicated by arrows $a'$ and $a''$ while counter or resisting pressure is simultaneously applied to the opposite side 58 as indicated by arrow $b$. The pressure applied at $a'$, $a''$ and $b$ may be achieved utilizing appropriately shaped movable dies; alternatively one of the dies may be fixed and the other movable. The dies applying pressure to the exterior surfaces 36 of the ribs will be so shaped as to avoid applying deforming pressure to the rounded outer surface 48 of the sheathed heater which remains exposed in the completed assembly. The pressure applied may be in the order of 2,500 tons and is sufficient first to fold or move the ribs inwardly of the channel into close engagement with the outer periphery of said sides 50 and protuberances 54 of the heater element 40 and thereafter, as the dies continue to move inwardly, to effectively compress the protuberances and sides of the heater element between the ribs 22 and the channel bottom 30 causing the thinner base wall 52 of element 40 to bend intermediate its side edges at 60. Simultaneously its side edges 58 pivot and slide inwardly along short arcuate surfaces 28, and slightly deforming, until the base 52 of said element 40 other than is end portions 40a intimately conforms through its full area to the vee-shaped channel bottom 30. Simultaneously, as pressure continues to be applied to the sides 50 of the heater element, the material of the sheath across junction 64 of the protuberances 54 is also reshaped and displaced inwardly as indicated by the inward bulge of the sheath wall at 66. On retraction of the pressure applying dies, the assembly of the heater element 40 within the channel 20 is complete.

As illustrated in FIG. 7 the ribs 22 closely grip the confined portions of the heater element. The engaged periphery of the sides, protuberances and base of the heater element 40 also closely conform to the inner surface of the ribs and channel base so that there is now established a good heat transfer relation between the heater element sheath 44 and the cooker wall 12. Also by reason of the confinement of the heating element 40 within the irregular configured channel 20, the heater element is stabilized against longitudinal movement. Moreover the exposed outer surface of the heater element has been substantially untouched or deformed in the assembly process and retains its original rounded shape.

Thus, it has been demonstrated that all of the recited objects, advantages and features of the invention are realizable in a highly practical manner and while obtaining a particularly strong and secure attachment of the heater element to the cooker.

Having described the invention, what is claimed is:

1. A method of staking a sheather electric heater element to the wall of a cooker comprising displacing metal from one side of the cooker wall to create an irregular channel with upstanding ribs along the two sides thereof, locating the sheathed heater element between the ribs and folding the ribs inwardly against the sides of the heater element therebetween while applying counter pressure to the opposite side of the cooker wall such that the confined portions of the heater element are conformed throughout their area to the thus engaged surfaces of the channel bottom and inner surfaces of the ribs.

2. A method of press-staking a sheathed electric heater element to the wall of an electric cooker wherein the cooker wall is of wrought metal and the sheathed heater element is of generally semicircular cross-section having a flat base with continuous protuberances along two sides of the element comprising the steps of displacing metal from one side of the cooker wall to create an irregular channel between two outstanding ribs having inner facing divergent surfaces which merge along arcs of short radii with thhe channel bottom, the channel being narrower at its base and wider at its mouth than the sheathed heater element base, locating the sheathed heater element between the ribs with its flat base facing the channel bottom, then folding the ribs inwardly against the sides of the sheathed heater element and compressing the confined portions of the element between said inwardly folded ribs and channel bottom such that they are conformed throughout their area to the thus engaged surfaces of the channel bottom and inner surface of the ribs.

3. A method of staking a sheathed heater element to the wall of an electric cooker wherein the cooker wall is of wrought metal and the sheathed heater element is of generally semicircular cross-section having rounded projections along its two sides at the flat base thereof, the method comprising the steps of a. displacing metal in opposite directions from one side of the cooker wall while forcing the displaced metal outwardly along arcs of short radii to form a pair of spaced ribs with a channel therebetween having a bottom width below the surface of the cooker wall side which is only slightly less than that of the sheathed heater element base;

b. shaping the forming ribs to have inner facing divergent surfaces spaced aprt at their extremities a greater distance apart than in the width of the sheathed heater element at its base;

c. placing the heater element between said ribs with its base facing the channel bottom; and d. then applying pressure to the ribs while applying counter pressure to the opposite side of the cooker wall so as to move the ribs into close engagement with the sides of the sheathed heater element including said rounded projections and conform the confined surfaces of the rounded projections and base of the sheathed heater element to the engaging surfaces of the ribs and channel base throughout the surface area thereof.

4. Method according to claim 3 wherein further metal is displaced from the cooker wall along either side of the formed channel so as to build the ribs to a height greater than that of the rounded projections along the sides of the sheathed heater element.

5. Method according to claim 4 wherein the channel width at the surface of the cooker wall side approximates the sheathed heater element base width.

6. Method according to claim 3 wherein the metal displaced in step (a) accords a shallow vee-shape in transverse cross section to the channel bottom.

7. Method according to claim 6 wherein as pressure is applied to the ribs and counter pressure to the opposite side of the cooker wall the sheathed heater element flat base yields along its longitudinal axis while its outer longitudinal edges effectively pivot and slide on the circuate channel sides of short radii until the sheathed heater element base conforms to the channel bottom.

8. An electric cooker having a bottom wall of wrought metal provided with an irregular channel in its underside and a sheathed electric heater element fixed within said channel in accordance with the method of claim 7.

9. A electric cooker having a wall of wrought metal provided with an irregular channel in one side thereof, and a sheathed electric heater element fixed in said channel, the channel having a bottom wall of shallow vee-shape in cross-section located interiorly of the cooker wall, the heater element having laterally projecting portions along the length of its two sides adjacent its base, and ribs at each side of the channel which project outwardly of the cooker wall and have inner surfaces in overlying engagement with the sides of the sheathed heater element and their laterally projecting portions, the confined sides, laterally projecting portions and basee of the sheathed heater element being compressed to the shape of the engaging surface of the ribs and channel bottom throughout the surface area thereof.

* * * * *